Patented May 29, 1945

2,376,984

UNITED STATES PATENT OFFICE 2,376,984

SUBSTITUTED BENZOQUINONES AND PROCESS FOR THEIR PRODUCTION

Max Tishler, Rahway, N. J., assignor to Merck & Co., Inc., Rahway, N. J., a corporation of New Jersey No Drawing. Application April 6, 1940, Serial No. 328,264

2 Claims. (Cl. 260—396)

This invention relates to alkyl substituted 1,4-benzoquinone, alkyl substituted 1,4-naphthoquinone, derivatives and intermediates, more particularly those containing a phytyl residue, and process for their production.

These compounds are important as therapeutic agents or as intermediate products. One of them, 2,5,6-trimethyl-3-phytyl-1,4-benzoquinone is related to and can be converted into alpha-tocopherol which possesses vitamin E activity. Another of them, 2-methyl-3-phytyl-1,4-naphthoquinone, is the antihemorrhagic principal, vitamin $K_1$.

I have found that tri-alkyl-1,4-benzohydroquinone and 2-alkyl-1,4-naphthohydroquinone react through their alkali metal salts with phytyl halides in nonpolar solvents such as ether, or benzene, to give the corresponding 3-phytyl-1,4-hydroquinones which are readily oxidizable to the corresponding quinones. The reactions may be summarized thus:

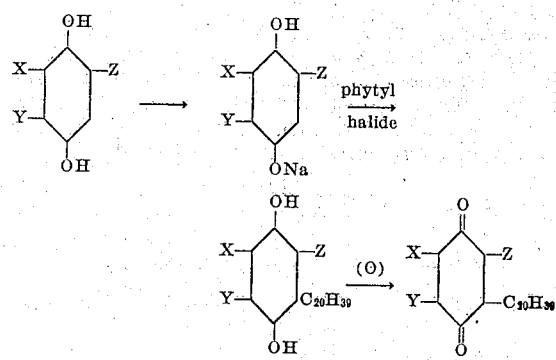

where X and Y may be hydrogen, and alkyl, or together may be the fused residue of a benzene ring, and where Z is an alkyl group.

In the process described herein the diacetates of the desired hydroquinone are preferable as starting materials since the free hydroquinones are generally difficult to purify and are extremely sensitive to air oxidation. In addition, some of them are difficult to work with in large quantities, being sternutatory as well as irritating to the skin.

In contrast, the diacetates are readily prepared and isolated and require no unusual precautions during such operations. The diacetates may be prepared by the reduction of the appropriate quinones in the presence of acetic anhydride and anhydrous sodium acetate.

The alkali metal salt of the desired hydroquinone is readily derived from the diacetate by heating with a solution containing an alkali metal alcoholate as, for example:

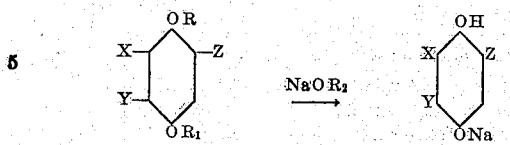

where R and $R_1$ are acyl radicals and $R_2$ is an alkyl radical. The alkali metal salt of the hydroquinone may also be made directly from the hydroquinone by treatment with an alkali metal alcoholate.

The following examples are given by way of illustration and not of limitation:

EXAMPLE I 2,5,6-trimethyl-3-phytyl-1,4-benzoquinone 3.04 gm. of 2,5,6-trimethylbenzohydroquinone are suspended in 100 cc. of dry benzene and the mixture stirred and heated on a steam bath. A gentle stream of nitrogen is allowed to pass over the mixture during the warming and the subsequent reaction. To the stirred mixture are added, dropwise, 4.6 cc. of an alcoholic solution of sodium methylate containing 1 gm. of sodium in 10 cc. of absolute methanol. During this addition the mixture becomes purple. When all the sodium methylate solution has been added, the mixture is boiled and stirred under reflux for about one hour. 7.2 gm. of phytyl bromide are added, dropwise, and the mixture refluxed for 8 hours. The mixture becomes deep red, and a new turbidity occurs. The mixture is then added to a mixture of ice and about 400 cc. of 2 per cent sulfuric acid, shaken, and the benzene layer is separated. The benzene solution is dried over anhydrous sodium sulfate, filtered, and the filtrate aerated in order to oxidize the hydroquinone to the quinone. The benzene solution is then poured through a tower of silicic acid. The uppermost layer of the tower consists principally of unchanged 2,5,6-trimethylbenzoquinone and is separated and discarded. The middle layer is eluted with ether and this chromatographic adsorption is repeated four times. The product, 2,5,6-trimethyl-3-phytyl-benzoquinone is obtained substantially pure by concentrating the last ether eluate.

The product may also be isolated by the method of Fieser, J. A. C. S., 61:3467 (1939), or through the diacetate which may be obtained by reductively acetylating the crude product. The diacetate of the crude mixture is then fractionally crystallized from methyl alcohol whereupon the diacetate of 2,5,6-trimethyl-3-phytyl-benzohydroquinone is obtained, melting point 56.5° C.

*Analysis*

|  | C | H |
|---|---|---|
| Calc | 77.04 | 10.51 |
| Found | 76.95 | 10.37 |

The diacetate is converted to the quinone by usual procedures of hydrolysis using either alkali or methylmagnesium iodide and oxidizing the hydroquinone by means of air, silver oxide, ferric chloride, etc.

2,5,6-trimethyl-3-phytyl-benzoquinone is obtained as a bright yellow oil.

*Analysis*

|  | C | H |
|---|---|---|
| Calc | 81.24 | 11.22 |
| Found | 81.04 | 11.00 |

Absorption spectrum: $Em=17.1$ at 2640.

The quinone is also characterized by the fact that on reduction in acid medium, alpha-tocopherol is formed.

EXAMPLE II

*2-methyl-3-phytyl-1,4-naphthoquinone*

5.6 gm. of 2-methyl-1,4-naphthohydroquinone diacetate are dissolved in 100 cc. dry benzene and, while stirring and warming the mixture in the presence of nitrogen, 4.5 cc. of 10 percent sodium methylate in methanol are added, dropwise. The mixture is refluxed for about 3 hours, during which a green solid separates. 8.2 gm. of phytyl bromide in 10 cc. of benzene are added and the mixture is boiled and stirred for about 6 hours. Meanwhile, the green solid disappears and a greenish-white turbidity occurs in the mixture of which the supernatant liquid is orange. The mixture is poured into a mixture of cracked ice and dilute hydrochloric acid and the benzene layer separated. The benzene layer is washed with water, concentrated, and the reddish-orange residue is taken up in petroleum ether.

The product may be isolated by chromatographic adsorption, by the method of Fieser or through the diacetate as described in Example I.

2-methyl-3-phytyl-1,4-naphthohydroquinone diacetate melts at 60° C. and is identical with the diacetate prepared from natural vitamin K₁.

2-methyl-3-phytyl-1,4-naphthoquinone is a golden yellow oil.

*Analysis*

|  | C | H |
|---|---|---|
| Calc | 82.61 | 10.29 |
| Found | 82.52 | 10.30 |

It is identical with natural vitamin K₁, as its color test with sodium ethylate (Dam, Karrer and others, Helv. 22:310 (1939)), its absorption spectra, its conversion to the diacetate of the dihydro form, and its antihemorrhagic activity indicate.

EXAMPLE III

*2-ethyl-3-phytyl-1,4-naphthohydroquinone*

0.83 gm. of powdered sodium are suspended in 50 cc. of dry benzene. To this suspension is added, with stirring, 4 equivalents of absolute ethanol and the mixture is left to stand overnight. While the mixture is kept under nitrogen, 9.2 gm. of 2-ethyl-1,4-naphthohydroquinone diacetate (prepared by the reductive acetylation of 2-ethyl-1,4-naphthoquinone) in 50 cc. of dry benzene are added. A bright green precipitate forms within a few minutes. The mixture is stirred and refluxed for one hour, and then 13 gm. of phytyl bromide are added. The mixture is stirred and refluxed during which sodium bromide separates and the green color becomes less intense. The mixture is then allowed to stand overnight at room temperature. A test portion of the mixture is now neutral to litmus indicating completion of the reaction. The mixture is poured into ice water, extracted with petroleum ether, the extract dried over anhydrous sodium sulfate and concentrated to a reddish-orange oil, which, like natural vitamin K₁, gives a transient purple color with sodium ethylate.

As the resultant oil, 2-ethyl-3-phytyl-1,4-naphthohydroquinone, is not crystallizable and is unstable to heat (and is therefore not distillable even under extremely low pressure), it is preferably isolated in the form of its diacetate which is obtained by reductive acetylation in the usual manner. The diacetate may be purified by solution in ether, concentration to an oil under vacuum and distillation at $10^{-5}$ mm. at 160° C. in a molecular still. 2-ethyl-3-phytyl-1,4-naphthohydroquinone diacetate is a pale yellow, oily, non-crystallizable liquid:

*Analysis*

|  | C | H | CH₃CO |
|---|---|---|---|
| Calc | 72.28 | 9.72 | 15.65 |
| Found | 72.48 | 9.84 | 15.44 |

On hydrolysis with methylmagnesium-iodide and subsequent oxidation by air or silver oxide as described in Example I, 2-ethyl-3-phytyl-1,4-naphthoquinone is obtained as a yellow, mobile liquid. The product gives the same characteristic color reaction with sodium methylate as does 2-methyl-3-phytyl-1,4-naphthoquinone.

*Analysis*

|  | C | H |
|---|---|---|
| Calc | 82.7 | 10.32 |
| Found | 82.57 | 10.35 |

I claim:
1. In a process for the production of 2,5,6-trimethyl-3-phytyl-1,4-benzoquinone, the steps comprising treating 2,5,6-trimethyl-1,4-benzohydroquinone with an alkali metal alcoholate and reacting the hydroquinone salt of an alkali metal thus formed with phytyl halide in the presence of a nonpolar solvent.

2. In a process for the production of 2,5,6-trimethyl-3-phytyl-1,4-benzoquinone, the steps comprising treating 2,5,6-trimethyl-1,4-benzohydroquinone diacetate with an alkali metal alcoholate and reacting the hydroquinone salt of an alkali metal thus formed with phytyl halide in the presence of a nonpolar solvent.

MAX TISHLER.